(12) United States Patent
Leroy

(10) Patent No.: US 12,130,988 B2
(45) Date of Patent: Oct. 29, 2024

(54) AUTOMATIC CONTROL OF IMAGE CAPTURE DEVICE DISPLAY OPERATION UNDERWATER

(71) Applicant: GoPro, Inc., San Mateo, CA (US)

(72) Inventor: Sylvain Leroy, Bures sur Yvette (FR)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 18/466,701

(22) Filed: Sep. 13, 2023

(65) Prior Publication Data
US 2024/0004497 A1 Jan. 4, 2024

Related U.S. Application Data

(63) Continuation of application No. 17/505,050, filed on Oct. 19, 2021, now Pat. No. 11,762,504, which is a continuation of application No. 16/947,292, filed on Jul. 27, 2020, now Pat. No. 11,163,400.

(51) Int. Cl.
| | |
|---|---|
| *G06F 3/041* | (2006.01) |
| *G06T 7/90* | (2017.01) |
| *G06V 20/00* | (2022.01) |
| *H04N 23/51* | (2023.01) |
| *H04N 23/54* | (2023.01) |
| *H04N 23/55* | (2023.01) |
| *H04N 23/63* | (2023.01) |

(52) U.S. Cl.
CPC .............. *G06F 3/0418* (2013.01); *G06T 7/90* (2017.01); *G06V 20/35* (2022.01); *H04N 23/51* (2023.01); *H04N 23/54* (2023.01); *H04N 23/55* (2023.01); *H04N 23/631* (2023.01)

(58) Field of Classification Search
CPC ......... G06F 3/0418; G06T 7/90; G06V 20/35; H04N 23/51; H04N 23/54; H04N 23/631; H04N 23/55
USPC ............................................................. 348/81
See application file for complete search history.

(56) References Cited

U.S. PATENT DOCUMENTS

| | | | |
|---|---|---|---|
| 11,163,400 B1 | 11/2021 | Leroy | |
| 11,762,504 B2 | 9/2023 | Leroy | |
| 2004/0076415 A1* | 4/2004 | Da Silva | G03B 17/08 396/25 |
| 2012/0236173 A1* | 9/2012 | Telek | H04N 23/62 348/E9.051 |
| 2015/0183498 A1* | 7/2015 | Wardle | B63G 8/001 114/337 |
| 2020/0265750 A1* | 8/2020 | Marquinez | G09F 21/023 |
| 2022/0035476 A1 | 2/2022 | Leroy | |

* cited by examiner

*Primary Examiner* — Allen C Wong
(74) *Attorney, Agent, or Firm* — ESPLIN & ASSOCIATES, PC

(57) ABSTRACT

An image capture device may include a touchscreen display, which may be used to receive user input. The image capture device may determine whether it is under water based on analysis of visual content captured by the image capture device. Responsive to determination that it is under water, the image capture device may change operation with respect to the touchscreen display.

20 Claims, 8 Drawing Sheets

AUTOMATIC CONTROL OF IMAGE CAPTURE DEVICE DISPLAY OPERATION UNDERWATER

FIELD

This disclosure relates to automatically controlling operation of a touchscreen display of an image capture device based on underwater location of the image capture device.

BACKGROUND

A touchscreen display of an image capture device may be used to receive user input. When the image capture device is immersed in water, water on the touchscreen display may cause the touchscreen display to register false touches, which may cause unwanted operation of the image capture device.

SUMMARY

This disclosure relates to automatic control of image capture device display operation underwater. An image capture device may include a housing. The housing may carry one or more of an image sensor, an optical element, a touchscreen display, and/or other components. The optical element may guide light within a field of view to the image sensor. The image sensor may generate a visual output signal conveying visual information defining visual content based on light that becomes incident thereon. The touchscreen display may be configured to receive user input via a user's engagement with the touchscreen display.

The visual content may be captured during a capture duration. Whether the image capture device is under water during the capture duration may be determined based on analysis of the visual content and/or other information. Responsive to determination that the image capture device is under water during the capture duration, operation of the image capture device with respect to the touchscreen display may be changed.

An electronic storage may store visual information defining visual content, information relating to visual content, information relating to analysis of visual content, information relating to touchscreen display, information relating to operation of the image capture device with respect to the touchscreen display, and/or other information.

The housing may carry one or more components of the image capture device. The housing may carry (be attached to, support, hold, and/or otherwise carry) one or more of an image sensor, an optical element, a touchscreen display, a processor, an electronic storage, and/or other components.

The image sensor may be configured to generate a visual output signal and/or other output signals based on light that becomes incident thereon and/or other information. The visual output signal may convey visual information and/or other information. The visual information may define visual content.

The optical element may be configured to guide light within a field of view to the image sensor. The field of view may be less than 180 degrees. The field of view may be equal to 180 degrees. The field of view may be greater than 180 degrees.

The touchscreen display may be configured to receive user input via a user's engagement with the touchscreen display.

The processor(s) may be configured by machine-readable instructions. Executing the machine-readable instructions may cause the processor(s) to facilitate automatic control of image capture device display operation underwater. The machine-readable instructions may include one or more computer program components. The computer program components may include one or more of a capture component, an underwater component, an operation component, and/or other computer program components.

The capture component may be configured to capture the visual content. The visual content may be captured during one or more capture durations.

The underwater component may be configured to determine whether the image capture device is under water during the capture duration(s). Location of the image capture device under water may be determined based on analysis of the visual content and/or the information.

In some implementations, the analysis of the visual content to determine whether the image capture device is under water during the capture duration(s) may include analysis of color components in the visual content. In some implementations, the analysis of the color components in the visual content may include comparison of a green component in the visual content to a blue component in the visual content, comparison of the green component in the visual content to a red component in the visual content, and/or other comparison of color components in the visual content. In some implementations, the analysis of the visual content to determine whether the image capture device is under water during the capture duration(s) may include scene classification to determine whether the visual content includes depiction of one or more underwater scenes.

The operation component may be configured to change operation of the image capture device. The operation component may be configured to change operation of the image capture device based on whether or not the image capture device is under water during the capture duration(s). The operation component may be configured to change operation of the image capture device with respect to the touchscreen display based on whether or not the image capture device is under water during the capture duration(s). The operation of the image capture device with respect to the touchscreen display may be changed responsive to determination that the image capture device is under water during the capture duration(s). In some implementations, the change to the operation of the image capture device with respect to the touchscreen display may be reversed responsive to determination that the image capture device is no longer under water.

In some implementations, the operation of the image capture device with respect to the touchscreen display may be changed to deactivate the touchscreen display. In some implementations, the operation of the image capture device with respect to the touchscreen display may be changed to modify options presented on the touchscreen display.

In some implementations, the operation of the image capture device with respect to the touchscreen display may be changed to modify sensitivity of the touchscreen display in receiving the user input via the user's engagement with the touchscreen display. In some implementations, the sensitivity of the touchscreen display may be changed to require greater force of the user's engagement with the touchscreen display to receive the user input. In some implementations, the sensitivity of the touchscreen display may be changed to require longer duration of the user's engagement with the touchscreen display to receive the user input.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
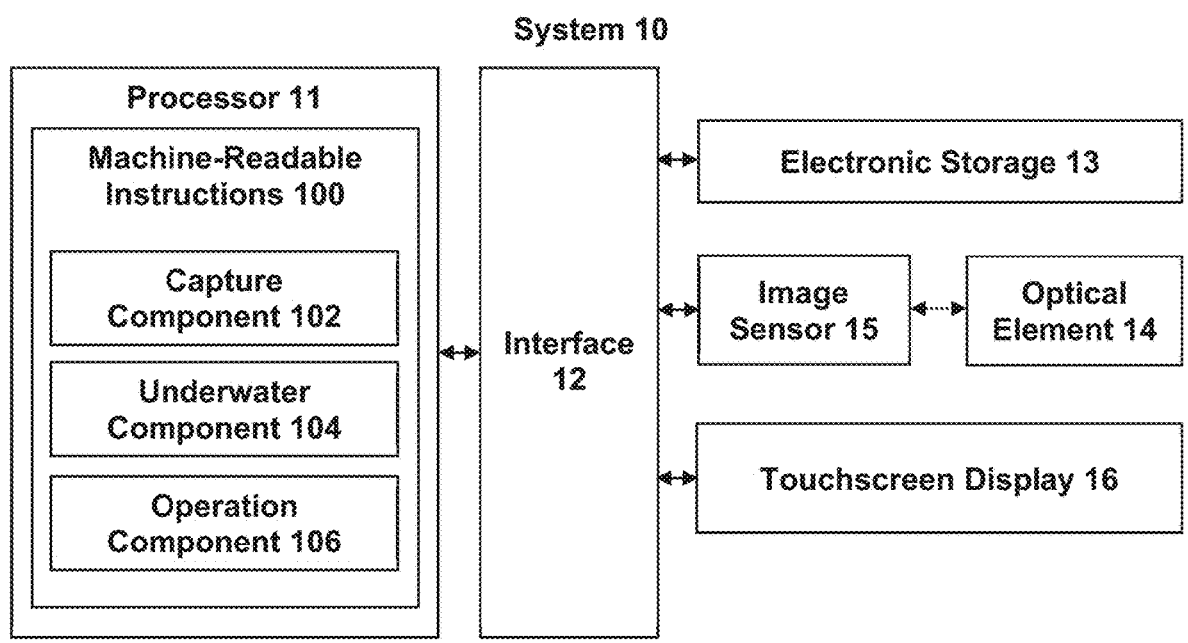
FIG. 1 illustrates an example system that automatically controls image capture device display operation underwater.

FIG. 1 illustrates a system 10 for automatically controlling image capture device display operation underwater. The system 10 may include one or more of a processor 11, an interface 12 (e.g., bus, wireless interface), an electronic storage 13, an optical element 14, an image sensor 15, a touchscreen display 16, and/or other components. The system 10 may include and/or be part of an image capture device. The image capture device may include a housing, and one or more of the optical element 14, the image sensor 15, the touchscreen display 16, and/or other components of the system 10 may be carried by the housing of the image capture device. The optical element 14 may guide light within a field of view to the image sensor 15. The image sensor 15 may generate a visual output signal conveying visual information defining visual content based on light that becomes incident thereon. The touchscreen display 16 may be configured to receive user input via a user's engagement with the touchscreen display 16.

The processor 11 may capture visual content during a capture duration. Whether the image capture device is under water during the capture duration may be determined by the processor 11 based on analysis of the visual content and/or other information. Responsive to determination that the image capture device is under water during the capture duration, operation of the image capture device with respect to the touchscreen display may be changed by the processor 11.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store visual information defining visual content, information relating to visual content, information relating to analysis of visual content, information relating to touchscreen display, information relating to operation of the image capture device with respect to the touchscreen display, and/or other information.

Visual content may refer to content of image(s), video frame(s), and/or video(s) that may be consumed visually. For example, visual content may be included within one or more images and/or one or more video frames of a video. The video frame(s) may define/contain the visual content of the video. That is, video may include video frame(s) that define/contain the visual content of the video. Video frame(s) may define/contain visual content viewable as a function of progress through the progress length of the video content. A video frame may include an image of the video content at a moment within the progress length of the video. As used herein, term video frame may be used to refer to one or more of an image frame, frame of pixels, encoded frame (e.g., I-frame, P-frame, B-frame), and/or other types of video frame. Visual content may be generated based on light received within a field of view of a single image sensor or within fields of view of multiple image sensors.

Visual content (of image(s), of video frame(s), of video(s)) with a field of view may be captured by an image capture device during a capture duration. A field of view of visual content may define a field of view of a scene captured within the visual content. A capture duration may be measured/defined in terms of time durations and/or frame numbers. For example, visual content may be captured during a capture duration of 60 seconds, and/or from one point in time to another point in time. As another example, 1800 images may be captured during a capture duration. If the images are captured at 30 images/second, then the capture duration may correspond to 60 seconds. Other capture durations are contemplated.

Visual content may be stored in one or more formats and/or one or more containers. A format may refer to one or more ways in which the information defining visual content is arranged/laid out (e.g., file format). A container may refer to one or more ways in which information defining visual content is arranged/laid out in association with other information (e.g., wrapper format). Information defining visual content (visual information) may be stored within a single file or multiple files. For example, visual information defining an image or video frames of a video may be stored within a single file (e.g., image file, video file), multiple files (e.g., multiple image files, multiple video files), a combination of different files, and/or other files.

The system 10 may be remote from the image capture device or local to the image capture device. One or more portions of the image capture device may be remote from or a part of the system 10. One or more portions of the system 10 may be remote from or a part of the image capture device. For example, one or more components of the system 10 may be carried by a housing, such as a housing of an image capture device. For instance, the optical element 14, the image sensor 15, and/or the touchscreen display 16 of the system 10 may be carried by the housing of the image capture device.

An image capture device may refer to a device captures visual content. An image capture device may capture visual content in form of images, videos, and/or other forms. An image capture device may refer to a device for recording visual information in the form of images, videos, and/or other media. An image capture device may be a standalone device (e.g., camera, action camera, image sensor) or may be part of another device (e.g., part of a smartphone, tablet).

Figure 3:
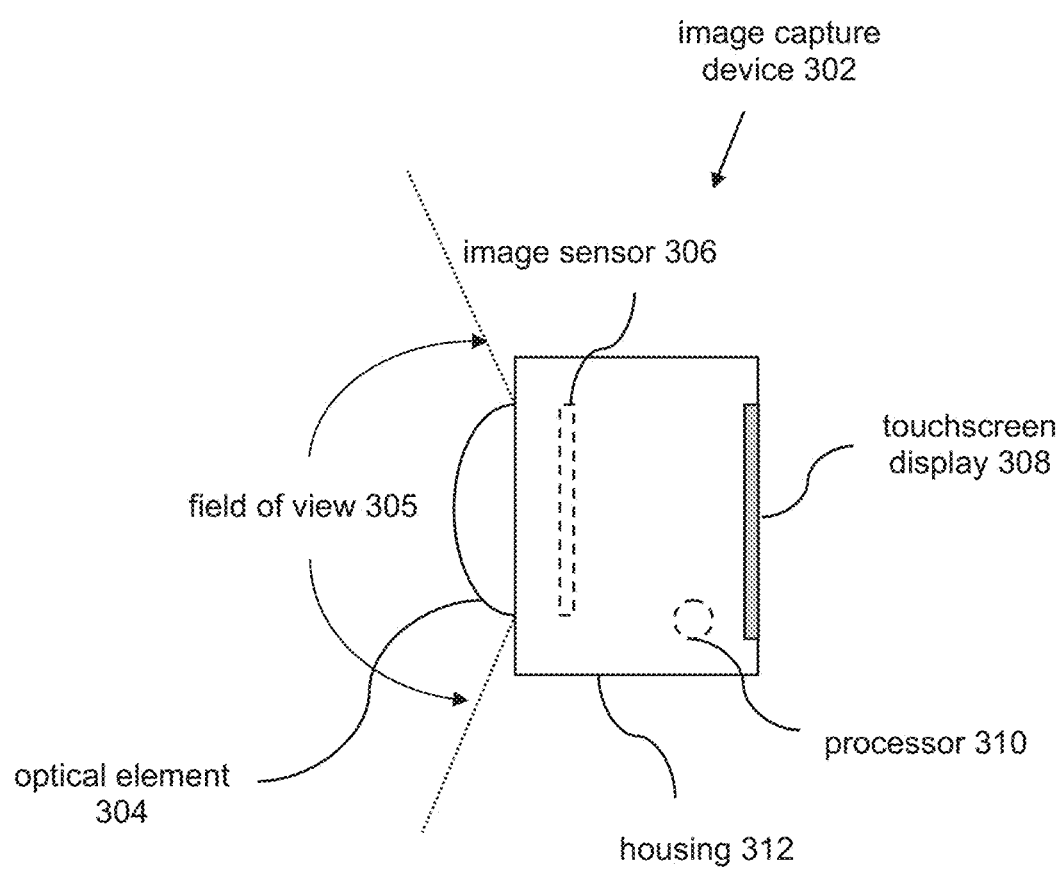
FIG. 3 illustrates an example image capture device.

FIG. 3 illustrates an example image capture device 302. Visual content (e.g., of image(s), video frame(s)) may be captured by the image capture device 302. The image capture device 302 may include a housing 312. The housing 312 may refer a device (e.g., casing, shell) that covers, protects, and/or supports one or more components of the image capture device 302. The housing 312 may include a single-piece housing or a multi-piece housing. The housing 312 may carry one or more components of the image capture device 302. The housing 312 may carry (be attached to, support, hold, and/or otherwise carry) one or more of an optical element 304, an image sensor 306, a touchscreen display 308, a processor 310, and/or other components. In some implementations, the housing 312 may carry multiple image sensors and multiple optical elements. Multiple image sensors and multiple optical elements may be used to capture spherical visual content. In some implementations, the housing 312 may carry multiple displays (e.g., multiple touchscreen display). For example, a touchscreen display may be carried on a rear side of the housing 312 and a touchscreen display may be carried on a front side of the housing 312. Change in operation of the touchscreen display described herein based on the image capture device being located under water may be applied to one or multiples of the display.

One or more components of the image capture device may be the same as, be similar to, and/or correspond to one or more components of the system 10. For example, the processor 310 may be the same as, be similar to, and/or correspond to the processor 11. The optical element 304 may be the same as, be similar to, and/or correspond to the optical element 14. The image sensor 306 may be the same as, be similar to, and/or correspond to the image sensor 15. The touchscreen display 308 may be the same as, be similar to, and/or correspond to the touchscreen display 16. The housing 312 may carry other components, such as the electronic storage 13. The image capture device may include other components not shown in FIG. 3. The image capture device may not include one or more components shown in FIG. 3. Other configurations of image capture devices are contemplated.

An optical element may include instrument(s), tool(s), and/or medium that acts upon light passing through the instrument(s)/tool(s)/medium. For example, an optical element may include one or more of lens, mirror, prism, and/or other optical elements. An optical element may affect direction, deviation, and/or path of the light passing through the optical element. An optical element may have a field of view (e.g., field of view 305 shown in FIG. 3). The optical element may be configured to guide light within the field of view (e.g., the field of view 305) to an image sensor (e.g., the image sensor 306).

The field of view may include the field of view of a scene that is within the field of view of the optical element and/or the field of view of the scene that is delivered to the image sensor. For example, referring to FIG. 3, the optical element 304 may guide light within its field of view to the image sensor 306 or may guide light within a portion of its field of view to the image sensor 306. The field of view of 305 of the optical element 304 may refer to the extent of the observable world that is seen through the optical element 304. The field of view 305 of the optical element 304 may include one or more angles (e.g., vertical angle, horizontal angle, diagonal angle) at which light is received and passed on by the optical element 304 to the image sensor 306. In some implementations, the field of view 305 may be greater than 180-degrees. In some implementations, the field of view 305 may be less than 180-degrees. In some implementations, the field of view 305 may be equal to 180-degrees.

In some implementations, the image capture device may include multiple optical elements. The image capture device may include multiple optical elements that are arranged on the housing to capture spherical images/videos (guide light within spherical field of view to one or more images sensors). For instance, the image capture device may include two optical elements positioned on opposing sides of the housing 362. The fields of views of the optical elements may overlap and enable capture of spherical images and/or spherical videos.

An image sensor may include sensor(s) that converts received light into output signals. The output signals may include electrical signals. The image sensor may generate output signals conveying visual information that defines visual content of one or more images and/or one or more video frames of a video. For example, the image sensor may include one or more of a charge-coupled device sensor, an active pixel sensor, a complementary metal-oxide semiconductor sensor, an N-type metal-oxide-semiconductor sensor, and/or other image sensors.

The image sensor may be configured generate output signals conveying information that defines visual content of one or more images and/or one or more video frames of a video. The image sensor may be configured to generate a visual output signal based on light that becomes incident thereon during a capture duration and/or other information. The visual output signal may convey visual information that defines visual content having the field of view. For example, referring to FIG. 3, the optical element 304 may be configured to guide light within the field of view 305 to the image sensor 306, and the image sensor 306 may be configured to generate visual output signals conveying visual information based on light that becomes incident thereon via the optical element 304.

The visual information may define visual content by including information that defines one or more content, qualities, attributes, features, and/or other aspects of the visual content. For example, the visual information may define visual content of an image by including information that makes up the content of the image, and/or information that is used to determine the content of the image. For instance, the visual information may include information that makes up and/or is used to determine the arrangement of pixels, characteristics of pixels, values of pixels, and/or other aspects of pixels that define visual content of the image. For example, the visual information may include information that makes up and/or is used to determine pixels of the image. Other types of visual information are contemplated.

Capture of visual content by the image sensor may include conversion of light received by the image sensor into output signals/visual information defining visual content. Capturing visual content may include recording, storing, and/or otherwise capturing the visual content for use in previewing and/or generating video content (e.g., content of video frames). For example, during a capture duration, the visual output signal generated by the image sensor 306 and/or the visual information conveyed by the visual output signal may be used to record, store, and/or otherwise capture the visual content for use in previewing and/or generating video content.

In some implementations, the image capture device may include multiple image sensors. For example, the image capture device may include multiple image sensors carried by the housing to capture spherical images/videos based on light guided thereto by multiple optical elements. For instance, the image capture device may include two image sensors configured to receive light from two optical elements positioned on opposing sides of the housing.

A touchscreen display may refer to an electronic device that provides visual presentation of information. The touchscreen display may include a color display and/or a non-color display. The touchscreen display may be configured to visually present information. The touchscreen display may be configured to present visual content, user interface, and/or other information. User interface (graphical user interface) may include a graphical form that enables a user to interact with the image capture device and/or see information provided by the image capture device. For example, referring to FIG. 3, the touchscreen display 308 may present user interface that enables a user to interact with the image capture device 302 (e.g., change setting of the image capture device, cause the image capture device to capture visual content), preview of visual content being captured by the image capture device 302 (e.g., preview of visual content before and/or during recording), visual content that has been captured by the image capture device 302, and/or other information for the image capture device 302.

The touchscreen display may be configured to receive user input via a user's engagement with the touchscreen display. A user may engage with the touchscreen display via interaction with one or more touch-sensitive surfaces/screens and/or other components of the touchscreen display. The touchscreen display may be configured to receive user input to change operation of the image capture device (e.g., change setting, start recording, stop recording). For example, referring to FIG. 3, the touchscreen display 308 may present one or more options for a user to provide input to the image capture device 302, such as by presenting one or more virtual/soft buttons. The user may change operation of the image capture device 302 by engaging one or more fingers on the location of the touchscreen display 308 corresponding to the virtual/soft button(s). The touchscreen display 308 may be configured to generate output signals indicating location of the user's engagement with the touchscreen display 308. User input (to change operation of the image capture device) may be received/determined based on the output signals generated by the touchscreen display 308.

The touchscreen display may include one or more touch-sensitive screens and/or other components. A user may engage with the touchscreen display by touching one or more portions of a touch-sensitive screen (e.g., with one or more fingers, stylus). A user may engage with the touchscreen display at a moment in time, at multiple moments in time, during a period, and/or during multiple periods. For example, a user may tap on, hold, or move along the touchscreen display to provide input to the image capture device. For example, a user may tap on and/or hold a finger on a portion of the touchscreen display corresponding to a virtual/soft button to provide input to the image capture device.

A processor may include one or more processors (logic circuitry) that provide information processing capabilities in the image capture device. The processor may provide one or more computing functions for the image capture device. The processor may operate/send command signals to one or more components of the image capture device to operate the image capture device. For example, referring to FIG. 3, the processor 310 may facilitate operation of the image capture device 302 in capturing image(s) and/or video(s), facilitate operation of the optical element 304 (e.g., change how light is guided by the optical element 304), and/or facilitate operation of the image sensor 306 (e.g., change how the received light is converted into information that defines images/videos and/or how the images/videos are post-processed after capture).

The processor 310 may obtain information from the image sensor 306 and/or facilitate transfer of information from the image sensor 306 to another device/component. The processor 310 may be remote from the processor 11 or local to the processor 11. One or more portions of the processor 310 may be remote from the processor 11 and/or one or more portions of the processor 10 may be part of the processor 310. The processor 310 may include and/or perform one or more functionalities of the processor 11 shown in FIG. 1.

The image capture device 302 may automatically control its operation based on whether or not it is under water. For example, the image capture device 302 may determine whether it is located under water or not based on analysis of visual content captured by the image capture device 302. Water on the touchscreen display 308 may cause false touches to be registered by the touchscreen display 308/the image capture device 302. For example, pressure of water on the touchscreen display 308 may generate force on the touchscreen display 308 and cause the image capture device 302 to interpret water force as user input. Such false touches may cause unwanted changes in the operation of the image capture device (e.g., unwanted change setting of the image capture device, unwanted change in mode of the image capture device, unwanted start/stop in capture of visual content)

Operation of the touchscreen display 308 may be automatically controlled based on determination that the image capture device 302 is under water so that false touches from water are not registered by the image capture device 302/the touchscreen display 308. For example, responsive to determination that the image capture device 302 is under water, the operation of the touchscreen display 308 may be changed to deactivate the touchscreen display 308 (e.g., turn off the touchscreen display 308, lock the touchscreen display 308 so that it does not register input). As another example, responsive to determination that the image capture device 302 is under water, the operation of the touchscreen display 308 may be changed to modify the sensitivity of the touchscreen display 308 (e.g., require greater force of user's engagement with the touchscreen display 308 to receive user input, require longer duration of user's engagement with the touchscreen display 308 to receive user input. As yet another example, responsive to determination that the image capture device 302 is under water, the operation of the touchscreen display 308 may be changed to modify options that are presented on the touchscreen display 308 (e.g., change layout of virtual/soft button(s) presented, change number and/or type of virtual/soft button(s) presented). Thus, the image capture device 302 may perform automatic control of the touchscreen display 308 in underwater environment (e.g., automatic screen lock in underwater environment).

In some implementations, automatic control of image capture device operation may be reversed based on determination that the image capture device 302 has been removed from water. For example, the operation of the touchscreen display 308 may have been changed based on the image capture device 302 detecting that it is under water (from analysis of visual content captured by the image capture device 302). Responsive to determination that the image capture device 302 is no longer under water (e.g., from analysis of visual content captured by the image capture device 302, from user input indicating that the image capture device 302 is not in water), the change(s) to the operation of the touchscreen display 308 may be reversed (e.g., restored to operation prior to the automatic change caused by underwater location of the image capture device 308).

Referring back to FIG. 1, the processor 11 (or one or more components of the processor 11) may be configured to obtain information to facilitate automatic control of image capture device display operation underwater. Obtaining information may include one or more of accessing, acquiring, analyzing, determining, examining, identifying, loading, locating, opening, receiving, retrieving, reviewing, selecting, storing, and/or otherwise obtaining the information. The processor 11 may obtain information from one or more locations. For example, the processor 11 may obtain information from a storage location, such as the electronic storage 13, electronic storage of information and/or signals generated by one or more sensors, electronic storage of a device accessible via a network, and/or other locations. The processor 11 may obtain information from one or more hardware components (e.g., an image sensor) and/or one or more software components (e.g., software running on a computing device).

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate automatic control of image capture device display operation underwater. The machine-readable instructions 100 may include one or more computer program components. The machine-readable instructions 100 may include one or more of a capture component 102, an underwater component 104, an operation component 106, and/or other computer program components.

The capture component 102 may be configured to capture the visual content. The visual content may be captured during one or more capture durations. A capture duration may refer to a time duration in which visual content is captured. The visual content may be captured using one or more image sensors (e.g., the image sensor 15). The visual content may be captured using light guided to the image sensor(s) via one or more optical elements (e.g., the optical element 14). For example, referring to FIG. A, the visual content may be captured using the image sensor 306. The visual content may be captured using light guided to the image sensor 306 via the optical element 304.

Capturing visual content during a capture duration may include using, recording, storing, and/or otherwise capturing the visual content during the capture duration. For instance, visual content may be captured while the image capture device is operating in a record mode (e.g., video recording mode, image capture mode) and/or operating in a preview mode (e.g., showing preview of visual content to be captured on a display). The visual content may be captured for use in generating images and/or video frames. The images/video frames may be stored in electronic storage and/or deleted after use (e.g., after preview). The visual content may be captured for use in determining whether or not the image capture device is under water.

For example, during a capture duration, the capture component 102 may use the visual output signal generated by the image sensor 15 and/or the visual information conveyed by the visual output signal to record, store, and/or otherwise capture the visual content. For instance, the capture component 102 may store, in the electronic storage 13 and/or other (permanent and/or temporary) electronic storage medium, information (e.g., the visual information) defining the visual content based on the visual output signal generated by the image sensor 15 and/or the visual information conveyed by the visual output signal during the capture duration. In some implementations, information defining the captured visual content may be stored in one or more visual tracks. In some implementations, the information defining the visual content may be discarded. For instance, the visual information defining the visual content may be temporarily stored (e.g., in a buffer) for use in determining whether or not the image capture device is under water, and the visual information may be deleted after the determination.

The underwater component 104 may be configured to determine whether or not the image capture device is under water during the capture duration(s). Whether or not the image capture device is located under water may be determined based on analysis of the visual content captured by the image capture device and/or the information. That is, the visual content captured by the capture component 102 may be analyzed to determine whether or not the image capture device is located under water. Analysis of the visual content may include examination, evaluation, processing, studying, and/or other analysis of the visual content. For example, analysis of the visual content may include examination, evaluation, processing, studying, and/or other analysis of one or more visual features/characteristics of the visual content. Analysis of the visual content may include analysis of visual content of a single image and/or analysis of visual content of multiple images. For example, visual features and/or visual characteristics of a single image may be analyzed to determine whether or not the image capture device is located under water. Visual features and/or visual characteristics of multiple images (e.g., captured at different moment, captured over a duration of time) may be analyzed to determine whether or not the image capture device is located under water.

In some implementations, the analysis of the visual content to determine whether the image capture device is under water during the capture duration(s) may include analysis of color components in the visual content. A color component may refer to a color in a color space. For example, in an RGB color space, color comments may include red component, green component, and blue component. Use of other color space/color components are contemplated. Analysis of color components in the visual content may include determination of amount/intensities of different color components in the visual content. For example, for an image, analysis of color component may include determination of how much red, greed, and blue are included within the image (e.g., pixel values in red channel, pixel values in green channel, pixel values in blue channel). In some implementations, the analysis of the visual content may be performed on a lower resolution version of the visual content (e.g., thumbnail). Computing color statistics on the lower resolution version of the visual content may provide for resource savings (e.g., lower consumption of power, lower processing requirement).

In some implementations, the analysis of the color components in the visual content may include comparison of different color components in the visual content. For example, analysis of the color components in the visual content may include comparison of a green component in the visual content to a blue component in the visual content (ratio of green to blue), comparison of the green component in the visual content to a red component in the visual content (ratio of green to red), and/or other comparison of color components in the visual content. The comparison/ratio of color components may be used to determine whether or not the image capture device is under water (e.g., the image capture device was under water when it captured the visual content).

Figure 4:
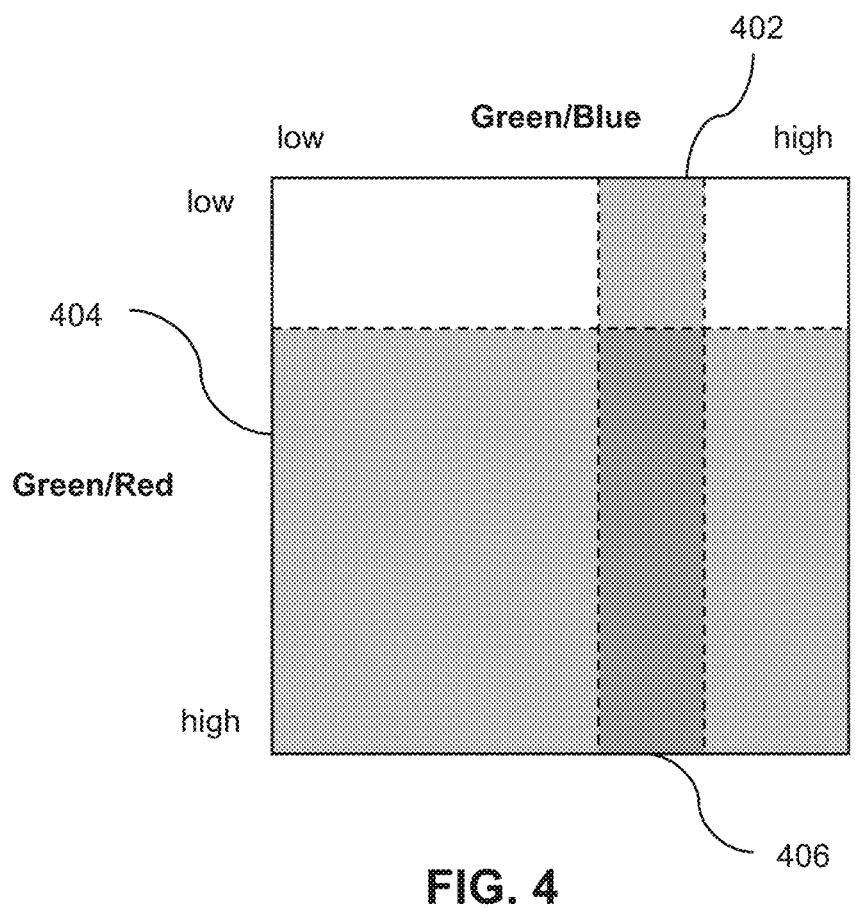
FIG. 4 illustrates example color component ratios of visual content.

In some implementations, specific ratios of color components may indicate that the visual content depicts an underwater scene. That is, specific ratios of color components may indicate that the visual content was captured by an image capture device while under water. FIG. 4 illustrates example color component ratios of visual content. In FIG. 4, different ratios of green-to-blue are shown along x-axis while different ratio of green-to-red are shown along y-axis. Particular regions of color ratios may indicate that the visual content depicts an underwater scene. A region of a color ratio may be defined by a lower limit (lower threshold), an upper limit (upper threshold), and/or other limits. For example, in FIG. 4, a region of green-to-blue ratio 402 may be defined by both a lower limit and an upper limit while a region of green-to-red ratio 404 may be defined by a lower limit. Visual content may be identified as depicting an underwater scene based on the color ratios of the visual content falling within one or more of the regions of color ratios. For example, for visual content to be identified as depicting an underwater scene, the color ratios of the visual content may need to fall within the region 402, the region 404, or both the region 402 and the region 404 (overlap region 406). Other limits/thresholds are contemplated.

In some implementations, the analysis of the visual content to determine whether the image capture device is under water during the capture duration(s) may include scene classification to determine whether the visual content includes depiction of one or more underwater scenes. One or more scene classification techniques (e.g., deep learning technique) may be used to determine probability that the visual content depicts underwater scene(s), and the probability may be used to determine whether or not the image capture device is under water. For example, a threshold probability value may be used, and the visual content may be identified as depicting an underwater scene if the probability value is greater than or equal to the threshold probability value. In some implementations, the scene classification may be used independently of the color-ratio analysis to determine whether or not the image capture device is under water. In some implementation, the scene classification may be used in conjunction with the color-ratio analysis to determine whether or not the image capture device is under water.

In some implementations, temporal smoothing may be applied to determination of whether or not the image capture device is under water. Temporal smoothing may include smoothing/modification of an underwater/non-underwater determination for a duration of time based on previous and/or subsequent determination. For example, capture duration an image may be a fraction of a second. Temporal smoothing may require the determination of whether or not the image capture device is under water to be consistent for a threshold amount of time (e.g., same for the entire threshold amount of time, same for more than a certain percentage of the threshold amount of time) before the determination is used to change operation of the image capture device. Temporal smoothing may use the same threshold amount of time or different threshold amounts of time for (1) determination that the image capture device is under water, and (2) determination that the image capture device is not under water. Temporal smoothing may use the same threshold amount of time or different threshold amounts of time for (1) determination that the location of the image capture device has changed from being under water to out of water, and (2) determination that the location of the image capture device has changed from being out of water to being under water.

For example, temporal smoothing may require consistent determination that the image capture device is under water for an amount of time before the status of the image capture device switches from being not under water to being under water. Temporal smoothing may require consistent determination that the image capture device is under water for a longer amount of time before the status of the image capture device switches from under water to not being under water. Such asymmetrical change in status of the image capture device may enable the operation of the image capture device to remain the same when the image capture device momentarily comes out of the water. Such asymmetrical change in status of the image capture device may enable the operation of the image capture device to remain the same for a duration of time after the image capture device comes out of water (e.g., to allow water residue on the touchscreen display, which may causing false touches, to run off and/or dry off).

In some implementations, change in status of the image capture device from being under water to not being under may require user input. For example, the image capture device may require the user to provide input that the image capture device is no longer under water. That is, while the image capture device may automatically detect when it is placed under water, the image capture device may need to be prompted by the user to change its status from being under water to no longer being under water. As another example, the image capture device may require the user to confirm the determination that the image capture device is no longer under water.

The operation component 106 may be configured to control operation of the image capture device. Controlling operation of the image capture device may include changing operation of the image capture device. For example, the operation component 106 may be configured to change operation of the image capture device based on whether or not the image capture device is under water during the capture duration(s). Change in operation of the image capture device may include change in operation with respect to one or more components of the image capture device. For example, the operation component 106 may be configured to change operation of the image capture device with respect to the touchscreen display 16 based on whether or not the image capture device is under water during the capture duration(s). Operation with respect to the touchscreen display 16 may include operation that impacts how the touchscreen display 16 operates. The operation of the image capture device with respect to the touchscreen display 16 may be changed responsive to determination that the image capture device is under water during the capture duration(s). That is, how the touchscreen display 16 operates may be changed based on determination by the underwater component 104 that the image capture device was under water when it captured the visual content. Other changes in operation of the image capture device are contemplated.

In some implementations, change(s) to the operation of the image capture device made by the operation component 106 responsive to determination that the image capture device being under water may be reversed responsive to determination that the image capture device is no longer under water. The operation of the image capture device may be restored to its default state and/or to its state before the change made by the operation component 106 (e.g., go back to the state of operation before the operate changed). For example, the change to the operation of the image capture device with respect to the touchscreen display 16 may be reversed responsive to determination that the image capture device is no longer under water. For instance, the touchscreen display 16 may be automatically locked when the underwater component 104 detects that the image capture device is under water, and the touchscreen display 16 may be automatically unlocked when the underwater component 104 detects that the image capture device has come out of water.

In some implementations, change(s) to the operation of the image capture device may be allowed to be made by the operation component 106 further based on user activating an auto-underwater-operation change option. For example, a setting of the image capture may include the auto-underwater-operation change option that, when enabled, allows the image capture device to automatically change operation based on whether the image capture device is or is not under water.

Operation of the image capture device with respect to the touchscreen display 16 may refer to one or more ways in which the image capture device operates the touchscreen display 16. Changing the operation of the image capture device with respect to the touchscreen display 16 may result in changes in the functioning of the touchscreen display 16.

In some implementations, responsive to determination that the image capture device is under water during the capture duration(s), the operation of the image capture device with respect to the touchscreen display 16 may be changed to deactivate the touchscreen display 16. Deactivating the touchscreen display 16 may include turning off the touchscreen display 16, turning off touch inputs from the touchscreen display 16 (locking the touchscreen display 16 so that inputs are no longer registered on the touchscreen display), changing type of information presented on the touchscreen display 16, and/or otherwise deactivating the touchscreen display 16.

In some implementations, responsive to determination that the image capture device is under water during the capture duration(s), the operation of the image capture device with respect to the touchscreen display 16 may be changed to modify options presented on the touchscreen display 16. Modifying options presented on the touchscreen display 16 may include modifying layout of virtual/soft button(s) presented on the touchscreen display 16 (e.g., where buttons are positioned; size, shape, and/or color of buttons), modifying number of virtual/soft button(s) presented on the touchscreen display 16 (e.g., reducing the number of buttons, increasing the number of buttons), modifying the type of virtual/soft button(s) presented on the touchscreen display 16 (e.g., changing which shortcuts/command buttons are presented), and/or otherwise modifying the options presented on the touchscreen display 16.

Figure 5A:
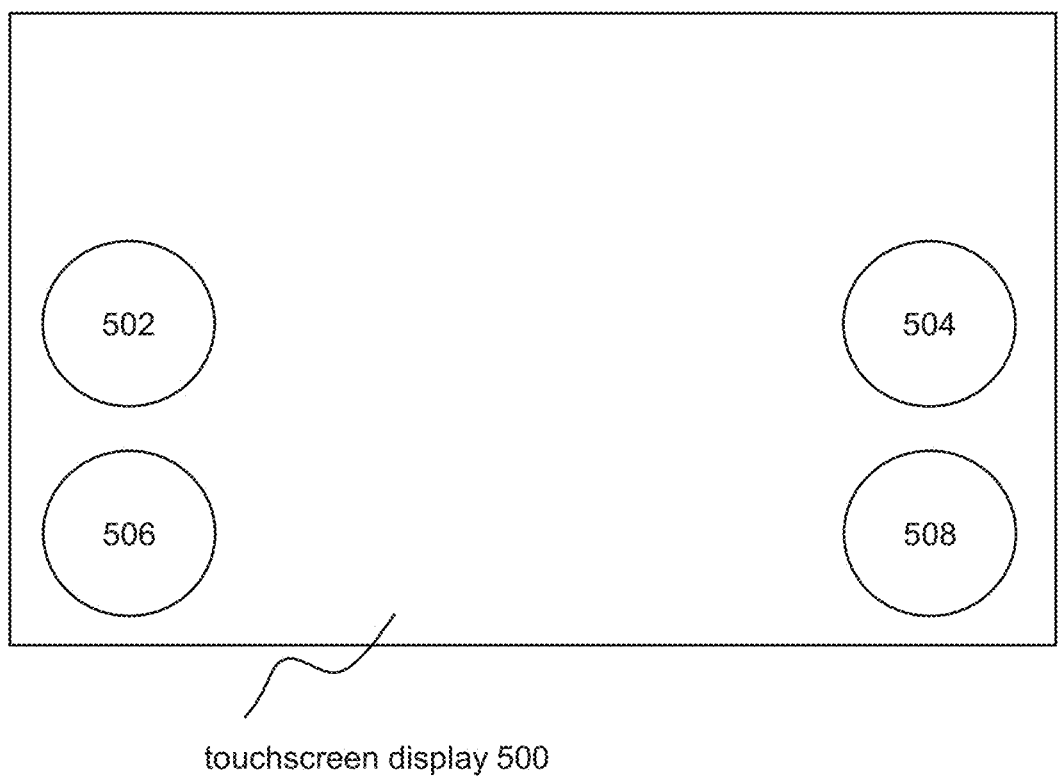
FIGS. 5A, 5B, 5C, and 5D illustrate example options presented on a touchscreen display.
Figure 5B:
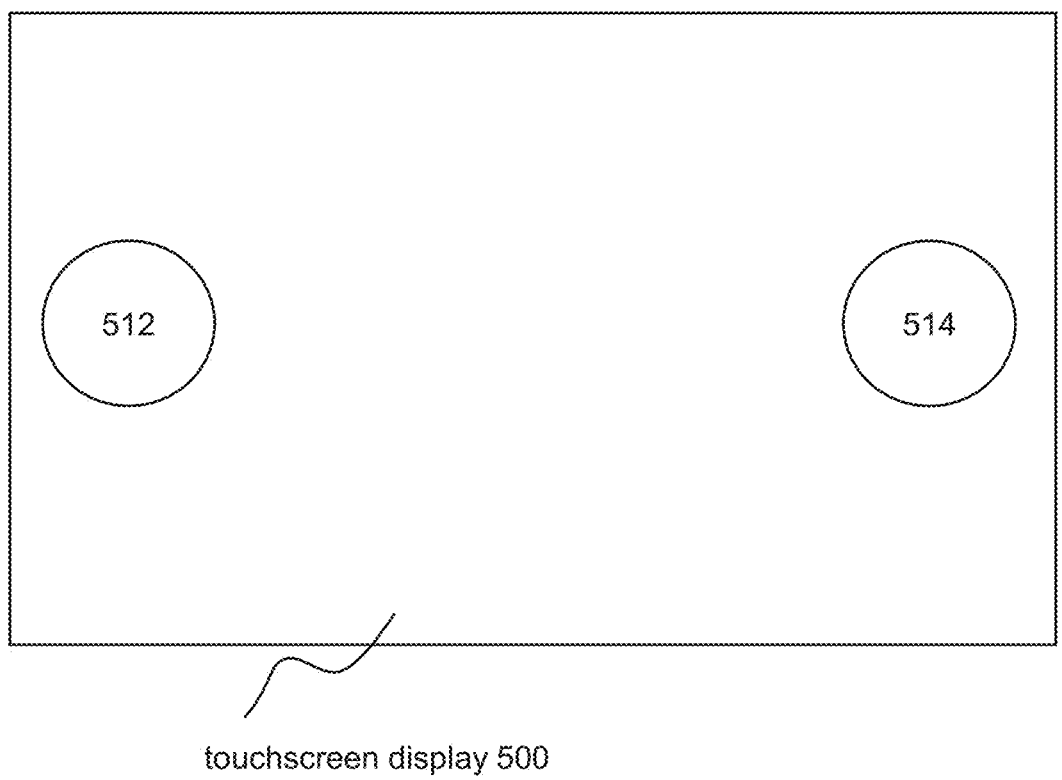

FIGS. 5A, 5B, 5C, and 5D illustrate example options presented on a touchscreen display 500 of an image capture device. The options may allow a user to provide input to the image capture device. The options may be provided as one or more virtual/soft buttons. The user may change operation of the image capture device by engaging one or more fingers on the location of the touchscreen display corresponding to the virtual/soft button(s). In FIG. 5A, the touchscreen display 500 may present buttons 502, 504, 506, 508. Individual buttons 502, 504, 506, 508 may be engaged by the user to activate the corresponding option. In FIG. 5B, the touchscreen display 500 may present buttons 512, 514. The buttons 512, 514 may have the same functionality as one or more of the buttons 502, 504, 506, 508 shown in FIG. 5A, or may have different functionality from the buttons 502, 504, 506, 508. The buttons presented on the touchscreen display 500 may change based on whether the image capture device is or is not located under water. For example, the touchscreen display 500 may present four buttons as shown in FIG. 5A while the image capture device is determined to be not under water, and may change to present two buttons as shown in FIG. 5B when the image capture device is determined to be under water. Compared to when the image capture device is not under water, fewer buttons may be presented (and provide fewer options) when the image capture device is under water.

As another example, the touchscreen display 500 may present two buttons as shown in FIG. 5B while the image capture device is determined to be not under water, and may change to present four buttons as shown in FIG. 5A when the image capture device is determined to be under water. Compared to when the image capture device is not under water, more buttons may be presented (and provide fewer options) when the image capture device is under water.

Figure 5C:
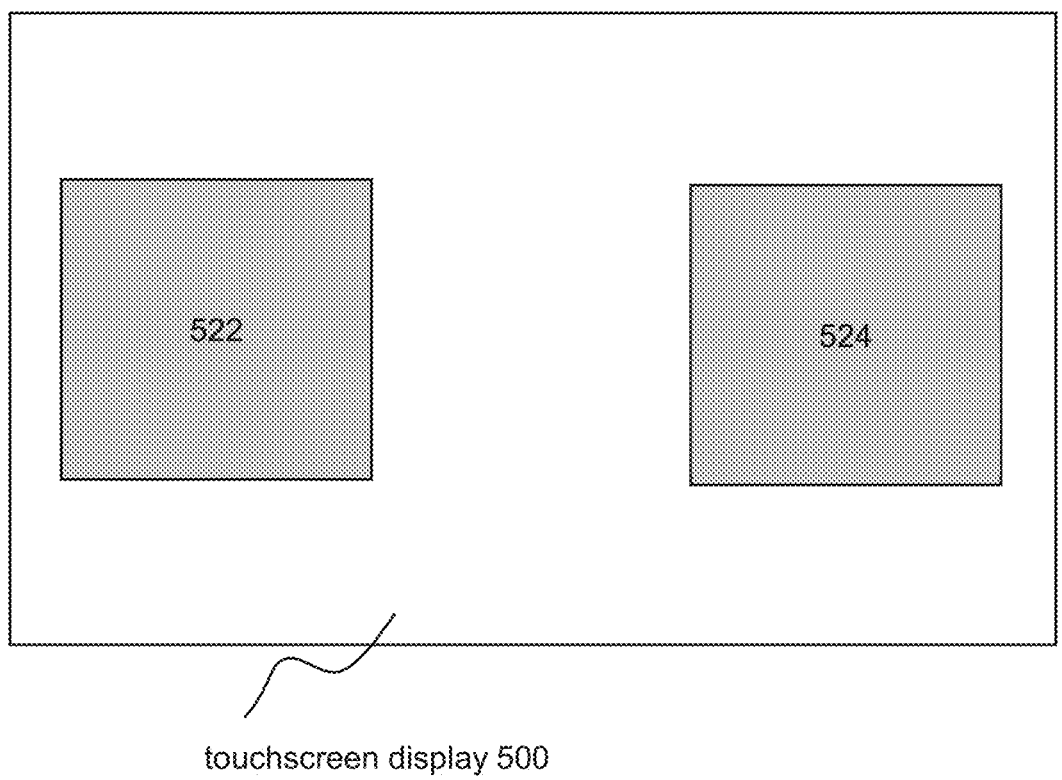

In FIG. 5C, the touchscreen display 500 may present buttons 522, 524. The buttons 522, 524 may have the same functionality as one or more of the buttons 512, 514 shown in FIG. 5B, or may have different functionality from the buttons 512, 514. The buttons presented on the touchscreen display 500 may change based on whether the image capture device is or is not located under water. For example, the touchscreen display 500 may present two circular buttons as shown in FIG. 5B while the image capture device is determined to be not under water, and may change to present two square buttons as shown in FIG. 5C when the image capture device is determined to be under water, or vice versa. The shape and/or size of the buttons may be changed to provide larger areas in which the user may interact with the touchscreen display 500 to provide input when the image capture device is under water.

Figure 5D:
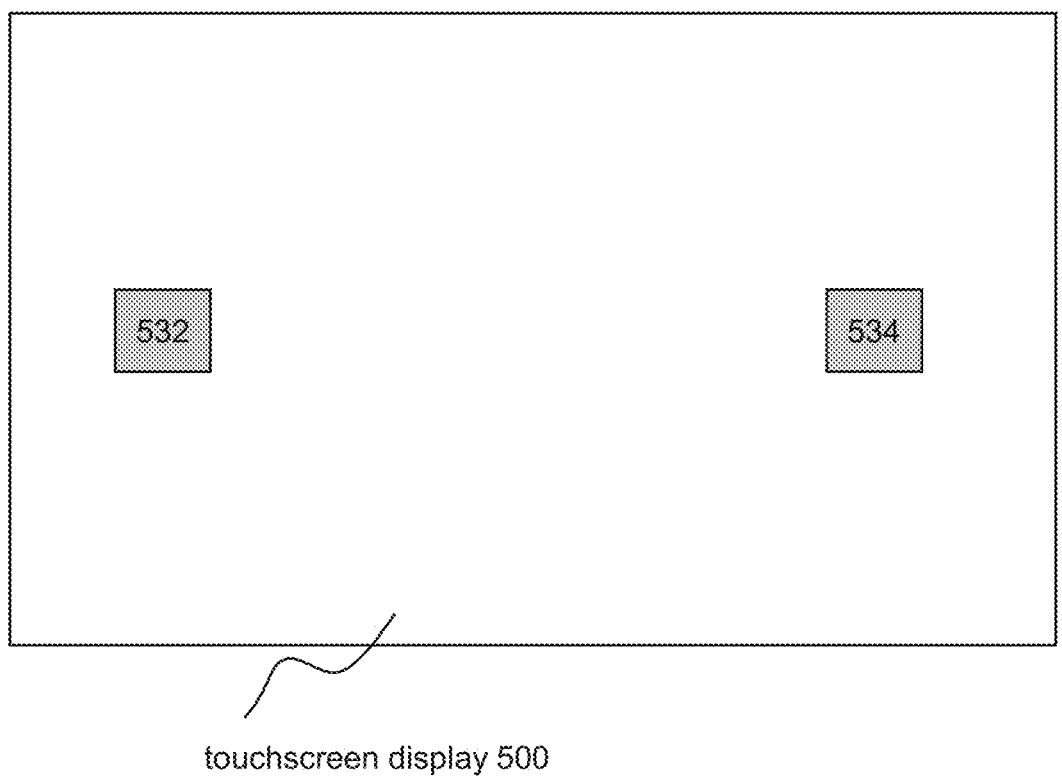

In FIG. 5D, the touchscreen display 500 may present buttons 532, 534. The buttons 532, 534 may have the same functionality as one or more of the buttons 512, 514 shown in FIG. 5B, or may have different functionality from the buttons 512, 514. The buttons presented on the touchscreen display 500 may change based on whether the image capture device is or is not located under water. For example, the touchscreen display 500 may present two circular buttons as shown in FIG. 5B while the image capture device is determined to be not under water, and may change to present two square buttons as shown in FIG. 5D when the image capture device is determined to be under water, or vice versa. The shape and/or size of the buttons may be changed to provide smaller areas in which the user may interact with the touchscreen display 500 to provide input when the image capture device is under water. Other changes in buttons are contemplated.

In some implementations, responsive to determination that the image capture device is under water during the capture duration(s), the operation of the image capture device with respect to the touchscreen display 16 may be changed to modify sensitivity of the touchscreen display 16. The sensitivity of the touchscreen display 16 in receiving the user input via the user's engagement with the touchscreen display 16 may be changed. Sensitivity of the touchscreen display 16 may refer to how sensitive the touchscreen display 16 is in detecting engagement with the touchscreen display and/or how sensitive the touchscreen display 16 is in interpreting engagement with the touchscreen display as input to the image capture device.

In some implementations, the sensitivity of the touchscreen display 16 may be changed to require greater force of the user's engagement with the touchscreen display 16 to receive the user input. The amount of force that must be detected by the touchscreen display 16 to be interpreted as engagement of the touchscreen display 16 and/or to be interpreted as input to the image capture device may be increased compared to when the image capture device is not in water. Thus, sensitivity of the touchscreen display 16 may be decreased while the image capture device is under water.

In some implementations, the sensitivity of the touchscreen display 16 may be changed to require longer duration of the user's engagement with the touchscreen display 16 to receive the user input. The duration with which force must be detected at a location on the touchscreen display 16 to be interpreted as engagement of the touchscreen display 16 and/or to be interpreted as input to the image capture device may be increased compared to when the image capture device is not in water. For example, longer press(es) of the touchscreen display 16 may be needed to provide user input when the image capture device is under water.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11, the electronic storage 13, the image sensor 15, and the touchscreen display 16 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
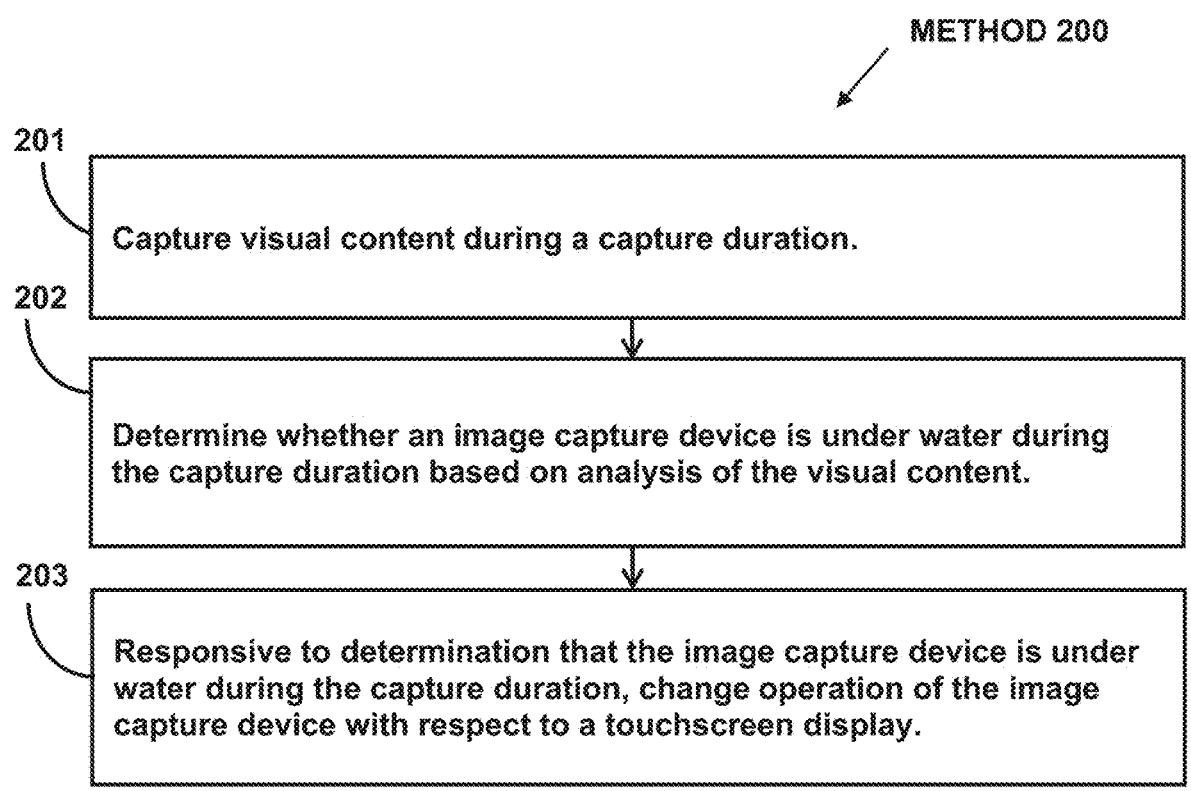
FIG. 2 illustrates an example method for automatically controlling image capture device display operation underwater.

FIG. 2 illustrates method 200 for automatically controlling image capture device display operation underwater. The operations of method 200 presented below are intended to be illustrative. In some implementations, method 200 may be accomplished with one or more additional operations not described, and/or without one or more of the operations discussed. In some implementations, two or more of the operations may occur simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, an image capture device may include a housing. The housing may carry one or more of an image sensor, an optical element, a touchscreen display, and/or other components. The optical element may guide light within a field of view to the image sensor. The image sensor may generate a visual output signal conveying visual information defining visual content based on light that becomes incident thereon. The touchscreen display may be configured to receive user input via a user's engagement with the touchscreen display.

At operation 201, the visual content may be captured during a capture duration. In some implementations, operation 201 may be performed by a processor component the same as or similar to the capture component 102 (Shown in FIG. 1 and described herein).

At operation 202, whether the image capture device is under water during the capture duration may be determined based on analysis of the visual content and/or other information. In some implementations, operation 202 may be performed by a processor component the same as or similar to the underwater component 104 (Shown in FIG. 1 and described herein).

At operation 203, responsive to determination that the image capture device is under water during the capture duration, operation of the image capture device with respect to the touchscreen display may be changed. In some implementations, operation 203 may be performed by a processor component the same as or similar to the operation component 106 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. An image capture device for changing operation underwater, the image capture device comprising:
a housing;
an image sensor carried by the housing and configured to generate a visual output signal conveying visual information based on light that becomes incident thereon, the visual information defining visual content;
an optical element carried by the housing and configured to guide light within a field of view to the image sensor;
a touchscreen display carried by the housing and configured to receive input to the image capture device; and
one or more physical processors configured by machine-readable instructions to:
determine whether the image capture device is under water; and
responsive to determination that the image capture device is under water, change functionality of the touchscreen display, wherein the change in the functionality of the touchscreen display prevents change in operation of the image capture device via interaction with the touchscreen display.

2. The image capture device of claim 1, wherein the change in the functionality of the touchscreen display includes deactivation of the touchscreen display.

3. The image capture device of claim 2, wherein the deactivation of the touchscreen display includes the touchscreen display being turned off.

4. The image capture device of claim 2, wherein the deactivation of the touchscreen display includes the touchscreen display being locked and not registering the interaction with the touchscreen display.

5. The image capture device of claim 1, wherein the change in the functionality of the touchscreen display preventing change in operation of the image capture device via the interaction with the touchscreen display includes the change in the functionality of the touchscreen display preventing change in mode of the image capture device via the interaction with the touchscreen display.

6. The image capture device of claim 1, wherein the change in the functionality of the touchscreen display preventing change in operation of the image capture device via the interaction with the touchscreen display includes the change in the functionality of the touchscreen display preventing change in setting of the image capture device via the interaction with the touchscreen display.

7. The image capture device of claim 1, wherein the change in the functionality of the touchscreen display preventing change in operation of the image capture device via the interaction with the touchscreen display includes the change in the functionality of the touchscreen display preventing start or stop of visual content capture by the image capture device via the interaction with the touchscreen display.

8. The image capture device of claim 1, wherein the determination of whether the image capture device is under water is performed based on analysis of color components in the visual content, the analysis of the color components in the visual content including comparison of a green component in the visual content to a blue component in the visual content and comparison of the green component in the visual content to a red component in the visual content.

9. The image capture device of claim 1, wherein the determination of whether the image capture device is under water is performed based on scene classification to determine whether the visual content includes depiction of an underwater scene.

10. A method for changing image capture device operation underwater, the method performed by an image capture device including one or more processors, an image sensor, an optical element, and a touchscreen display, the image sensor configured to generate a visual output signal conveying visual information based on light that becomes incident thereon, the visual information defining visual content, the optical element configured to guide light within a field of view to the image sensor, the touchscreen display configured to receive input to the image capture device, the method comprising:

determining whether the image capture device is under water; and
  responsive to determination that the image capture device is under water, changing functionality of the touchscreen display, wherein the change in the functionality of the touchscreen display prevents change in operation of the image capture device via interaction with the touchscreen display.

11. The method of claim 10, wherein the change in the functionality of the touchscreen display includes deactivation of the touchscreen display.

12. The method of claim 11, wherein the deactivation of the touchscreen display includes the touchscreen display being turned off.

13. The method of claim 11, wherein the deactivation of the touchscreen display includes the touchscreen display being locked and not registering the interaction with the touchscreen display.

14. The method of claim 10, wherein the change in the functionality of the touchscreen display preventing change in operation of the image capture device via the interaction with the touchscreen display includes the change in the functionality of the touchscreen display preventing change in mode of the image capture device via the interaction with the touchscreen display.

15. The method of claim 10, wherein the change in the functionality of the touchscreen display preventing change in operation of the image capture device via the interaction with the touchscreen display includes the change in the functionality of the touchscreen display preventing change in setting of the image capture device via the interaction with the touchscreen display.

16. The method of claim 10, wherein the change in the functionality of the touchscreen display preventing change in operation of the image capture device via the interaction with the touchscreen display includes the change in the functionality of the touchscreen display preventing start or stop of visual content capture by the image capture device via the interaction with the touchscreen display.

17. The method of claim 10, wherein the determination of whether the image capture device is under water is performed based on analysis of color components in the visual content, the analysis of the color components in the visual content including comparison of a green component in the visual content to a blue component in the visual content and comparison of the green component in the visual content to a red component in the visual content.

18. The method of claim 10, wherein the determination of whether the image capture device is under water is performed based on scene classification to determine whether the visual content includes depiction of an underwater scene.

19. An image capture device for changing operation underwater, the image capture device comprising:

a housing;
  an image sensor carried by the housing and configured to generate a visual output signal conveying visual information based on light that becomes incident thereon, the visual information defining visual content;
  an optical element carried by the housing and configured to guide light within a field of view to the image sensor;
  a touchscreen display carried by the housing and configured to receive input to the image capture device; and
  one or more physical processors configured by machine-readable instructions to:
    determine whether the image capture device is under water;
    responsive to determination that the image capture device is under water, change functionality of the touchscreen display, wherein the change in the functionality of the touchscreen display prevents change in operation of the image capture device via interaction with the touchscreen display; and
    responsive to determination that the image capture device is no longer under water, reverse the change to the functionality of the touchscreen display.

20. The image capture device of claim 19, wherein the change in the functionality of the touchscreen display preventing change in operation of the image capture device via the interaction with the touchscreen display includes the change in the functionality of the touchscreen display preventing change in mode or setting of the image capture device via the interaction with the touchscreen display.

* * * * *